(12) United States Patent
Krasnov

(10) Patent No.: US 6,653,664 B1
(45) Date of Patent: Nov. 25, 2003

(54) BANDGAP ENGINEERING OF TFEL DEVICES

(75) Inventor: Alexey N. Krasnov, Brampton (CA)

(73) Assignee: Luxell Technologies, Inc. (CA)

( * ) Notice: Subject to any disclaimer, the term of this patent is extended or adjusted under 35 U.S.C. 154(b) by 0 days.

(21) Appl. No.: 10/139,291

(22) Filed: May 7, 2002

(51) Int. Cl.$^7$ .............................................. H01L 33/00
(52) U.S. Cl. ........................................ 257/103; 257/614
(58) Field of Search ................................... 257/614, 613, 257/607, 655, 191, 101, 102, 103

(56) References Cited

PUBLICATIONS

R. Mach and G.O. Muller, Phys. Stat. Sol. (a) 81, 609 (1984).
P. De Visschere and K. Nyets, J. Luminescence 52, 313 (1992).
A.N. Krasnov and P.G. Hofstra, Prog. Cyrst. Growth & Charact. Mat. (2001).
A.N. Krasnov, P.G. Hofstra, and M.T. McCullough, J. Vac. Sci. Tech. (a) 18, 671 (2000).
J. Benoit, C. Barthou and P. Benalloul, J. Appl. Phys. 73, 1435 (1993).
R. Mach, J. von Kalben, G.O. Muller. W. Gericke, and G.U. Reinsperger, J. Appl. Phys. 54, 4657 (1983).
A.N. Krasnov, R.C. Bajcar, and P.G. Hofstra, J. Va Sci. Tech. (a) 16, 906 (1998).
K.K. Thornber, J. Appl. Phys. 52, 279 (1981).
X. Zeng and M. Huang, J. Luminescence 40&41, 913 (1988).
A.N. Krasnov, Appl, Phys. Lett. 74, 1120 (1999).
W. Walukiewicz, Mater. Res. Soc. 148, 137 (1989).
J.M. Jarem and V.P. Singh, IEEE Trans. Electron Devices ED–35, 1834 (1988).
R. Barker, J. Luminescence 23, 101 (1981).

*Primary Examiner*—Mark V. Prenty
(74) *Attorney, Agent, or Firm*—Katten Muchin Zavis Rosenman

(57) ABSTRACT

Bandgap engineering of thin-film electroluminescent (TFEL) devices increases their efficiency and brightness. An alternating current thin-film electroluminescent display has two stacked dielectrics, a semiconductor active layer therebetween, and metallic cladding electrodes at each side thereof. The semiconductor layer is developed by automated thermal co-evaporation so as to provide a monotonic decrease of the band gap thereof from the respective interfaces with the stacked dielectrics to the middle of the semiconductor active layer so that the dopant concentration thereof is maintained at about 0.7 %.

2 Claims, 3 Drawing Sheets

BANDGAP ENGINEERING OF TFEL DEVICES

FIELD OF THE INVENTION

The present invention relates generally to thin-film electroluminescent devices and more particularly relates to thin-film electroluminescent device where bandgap engineering has been used to design the device.

BACKGROUND OF THE INVENTION

The operational efficiency of today's alternating-current thin-film electroluminescent (ACTFEL) display depends on three main factors, which are the radiative efficiency, the outcoupling efficiency of the emitted photons, and the excitation efficiency of dopant centers. (See R. Mach and G. O. Muller, Phys. Stat. Sol. (a) 81, 609 (1984).) These three components of the total efficiency must be increased to meet the brightness requirements for full-color applications and to improve the operational parameters of a monochrome (typically, ZnS:Mn-based) display. The radiative efficiency is determined mainly by the recombination cross-section of the luminescent centers. A straightforward increase of the dopant concentration results in higher concentration quenching of luminescence. (See P. De Visschere and K. Neyts, J. Luminescence 52, 313 (1992)) The improvement of the photon outcoupling efficiency is mainly associated with the optical matching of the individual layers of the device. Difficulties in obtaining a significant increase in the excitation efficiency of luminescent centers are generally attributed to the low efficiency of the tunneled electrons, caused partially by space charge formation and a lack of electron acceleration due to short electron mean-free path (the distances required for electrons to gain enough energy in ZnS to impact excite Mn centers and to ionize the lattice are 16 and 40 nm, respectively). (See for example, A. N. Krasnov, P. G. Hofstra, and M. T. McCullough, J. Vac. Sci. Tech. (a) 18, 671 (2000).) This leads to a decreasing impact ionization probability with the distance from the insulator-semiconductor interface (ISI) to the middle of the phosphor layer. As a result, only the phosphor region adjacent to the cathodic ISI is efficiently involved in light emission. (See J. Benoit, C. Barthou and P. Benalloul, J. Appl. Phys. 73, 1435 (1993).) All attempts to increase the impact ionization probability of the kinetic electrons through the phosphor bandgap $E_g$ reduction have so far shown little success, mainly due to a decreased energy of the tunneled electrons or temperature quenching problems. (See R. Mach, J. von Kalben, G. O. Muller, W. Gericke, and G. U. Reinsperger, J. Appl. Phys. 54, 4657 (1983).)

SUMMARY OF THE INVENTION

According to an aspect of the present invention there is provided an alternating current thin-film electroluminescent display having two stacked dielectrics a semiconductor active layer therebetween, and metallic cladding electrodes at each side thereof; wherein the semiconductor layer is developed by automated thermal co-evaporation so as to provide a monotonic decrease of the band gap thereof from the respective interfaces with said stacked dielectrics to the middle of said semiconductor active layer so that the dopant concentration thereof is maintained at about 0.7%.

BRIEF DESCRIPTION OF THE DRAWINGS

Preferred embodiments of the present invention will now be explained, by way of example only, with reference to the attached Figures in which.

DESCRIPTION OF THE INVENTION

As discussed further herein, bandgap engineering is used to create an ACTFEL device with improved efficiency through increasing the impact ionization probability of kinetic electrons.

The device preparation is described in detail elsewhere. (See for example, A. N. Krasnov R. C. Bajcar, and P. G. Hofstra, J. Vac Sci. Tech. (a) 16, 906 (1998)). Briefly, two stacked dielectrics.(nornally, SiON as a barrier and $Y_2O_3$ or $Al_2O_3$-based insulator as an "injector") where used to confine current in semiconductor active layer (ZnS doped with Mn in conventional devices). Opaque Al and transparent polycrystalline indium-tin-oxide cladding electrodes were used to ensure matrix addressing of the device. Upon application of the external bipolar trapezoidal waveform, the trapped electrons start tunneling from the momentary cathodic ISI into the bulk of the active layer, causing excitation of the luminescent impurity centers and ionization of the crystal lattice.

To demonstrate the bandgap engineering concept, a $ZnS_xSe_{1-3}$ alloy doped with Mn has been chosen for the active layer of the proposed device. The layer was engineered through automated thermal co-evaporation in such a way as to provide a monotonic decrease of the bandgap from both interfaces to its middle part with precise control of the dopant concentration, which was maintained at ~0.7%. The presence of wide bandgap ZnS at both ISIs ensures high energy of the tunneled electrons. At the same time, the impact ionization threshold energy of the semiconductor lattice is expected to decrease with bandgap from the momentary cathodic interface to the middle part of the active layer. In fact, the ionization rate $\alpha_i$ is defined as the number of electron-hole pairs generated by an electron per unit time and is a function of the electric field and the ionization threshold energy $E_i$:

$$\alpha_i = \left(q\frac{F}{F_i}\right)\exp\left[-\left(\frac{F_0}{F}\right)^2\right], \tag{1}$$

where $F=f(E_i^2)$ and $F_0$ is a characteristic electric field. (See, K. K. Thomber, J. Appl. Phys. 52, 279 (1981).) Thus, $\alpha_i$ is expected to increase dramatically with decreasing $E_i$, where $E_i$ is proportional to the bandgap energy.

Figure 1A:
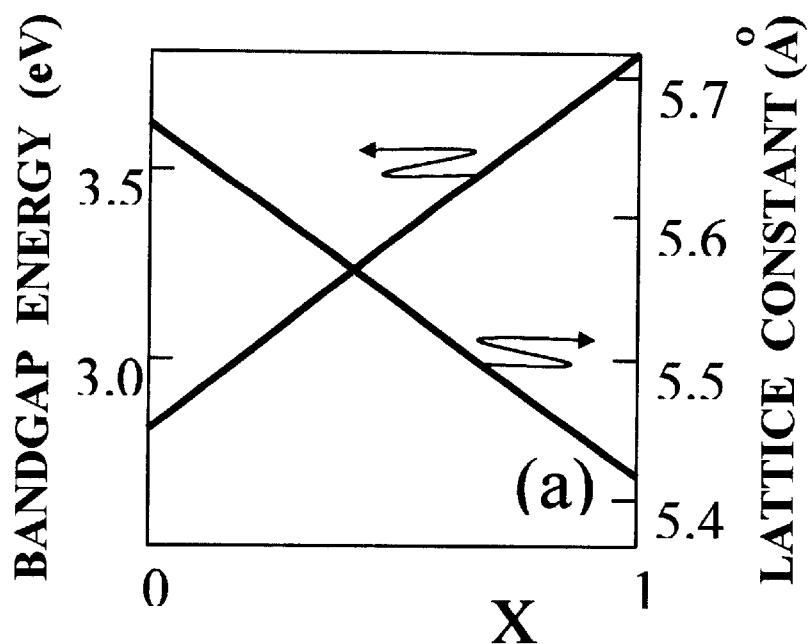
FIGS. 1a and 1b show a pair of graphs depicting dependence of parameters on $ZnS_xSe_{1-x}$ alloy composition.

ZnS (room temperature bandgap $E_g$=3.7 eV) and ZnSe ($E_g$=2.68 eV) are known to ideally match in both single crystalline and polycrystalline phases and to produce an amenable $ZnS_xSe_{x-1}$ compound with linear dependence of almost all its properties on the alloy composition (FIG. 1a). ZnS, ZnSe, and their alloys have also very similar electronic structures. (See X. Zeng and M. Huang, J Luminescence 40&41, 913 (1988)) Mn emission curve peaks at 585 nm for any $ZnS_xSe_{x-1}$ composition and corresponds to a $^4T_1-^6A_1$ transition within Mn $3d^5$ configuration.

Figure 1B:
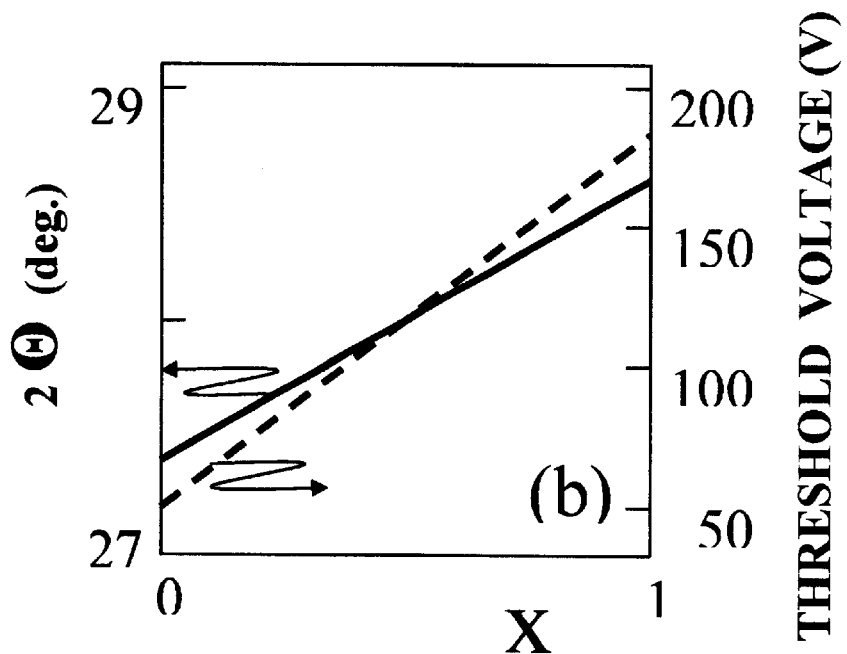

X-ray diffraction measurements were used to calibrate the alloy composition. Diffraction peak shifts linearly from 28.6° for ZnS(111) to 27.3° for ZnSe(11) (FIG. 1b). For quick estimation of the $ZnS_xSe_{x-1}$ composition, threshold voltage of the flat-band device can also be used. To verify the band profile of the active layer, we used the secondary electron emission (SEE) contrast profile technique developed by Krasnov. (See A. N. Krasnov, Appl. Phys. Lett. 74, 1120 (1999).).

It is known that for some compounds of the II–VI family, including ZnS, ZnSe, and their alloys, the energy level position of particular native or impurity defect remains roughly the same in respect to the vacuum level. (See W. Walukiewicz, Mater. Res. Soc. 148, 137 (1989).) Changes in the alloy composition, however, determine the position of the energy level in respect to the conduction and valence bands. This in turn determines the space charge distribution and the dynamics of carrier transfer inside the active layer, favoring positive space charge formation closer to the ISIs and not in the bulk of the active layer.

Figure 2:
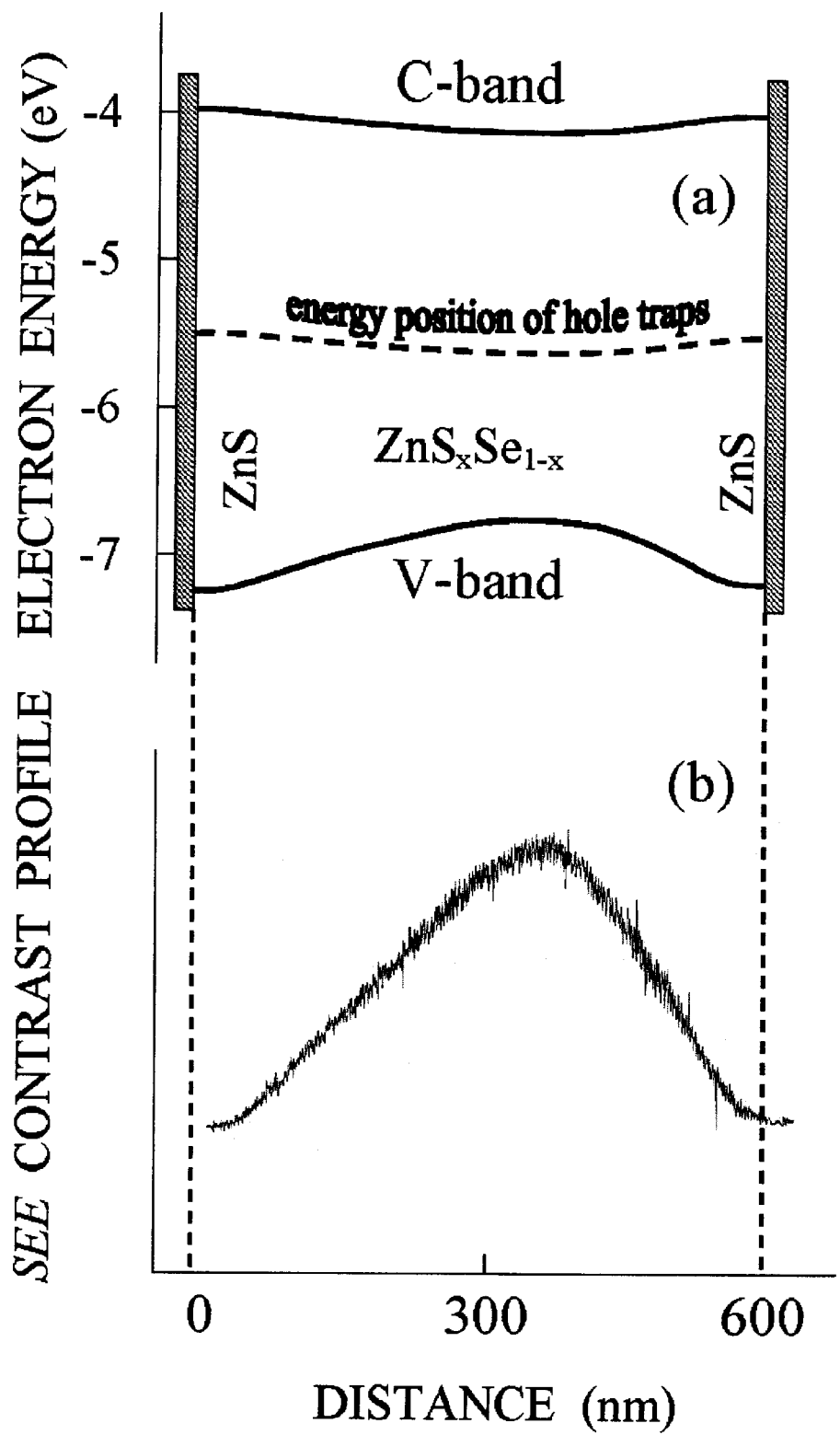
FIG. 2 shows a graph depicting the band profile of the bandgap engineered device (a) and its SEE contrast profile pattern (b)

It should be noted at this point that the $ZnS_xSe_{1-x}$:Mn alloy is used in this study only in order to demonstrate the concept and may not be the best choice for a bandgap engineered TFEL device. The reasons for that are as follows. The impact cross-section $a\sigma$ for Mn is $10^{-16}$ $cm^{-2}$ in ZnS compared to $5 \times 10^{-17}$ $cm^{-2}$ in ZnSe; the reduction in $\sigma$ decreases the excitation efficiency of the impurity center. The luminescence decay time of Mn centers has been found to be 1 and 0.1 $\mu s$ for ZnS and ZnSe, respectively, which significantly decreases the integral brightness of the device; the negative impact of this effect is less pronounced if the device is driven at high frequencies. Finally, the transmittance of the alloy decreases linearly from 0.9 to 0.7 with the Se content increase from 0 to 1. Therefore, in parallel with the ionization rate increase, the absorption coefficient increase also takes place. This is taken into account during the active layer design. FIG. 2 shows schematically the band profile of the proposed device, which is expected to enhance carrier multiplication and increase total efficiency of the device. It should be pointed out that the classical understanding of the multiplication factor is applicable in this particular case only to a half of the device between momentary cathodic interface and the region of the active layer with minimum bandgap. (See J. M. Jarem and V. P. Singh, IEEE Trans. Electron Devices ED-35, 1834 (1988).) Also demonstrated in FIG. 2 is an example of SEE contrast profile of the active layer. Taking into account that the refractive index is 2.89 for ZnSe and 2.35 for ZnS, the region with the minimum bandgap was placed closer to the top (Al-side) interface of the structure, thus providing a better outcoupling of the emitted photons. The optimal alloy composition of the middle part of the active layer was found to be $ZnS_{0.6}Se_{0.4}$ with the bandgap of ~3.3 eV.

Figure 3:
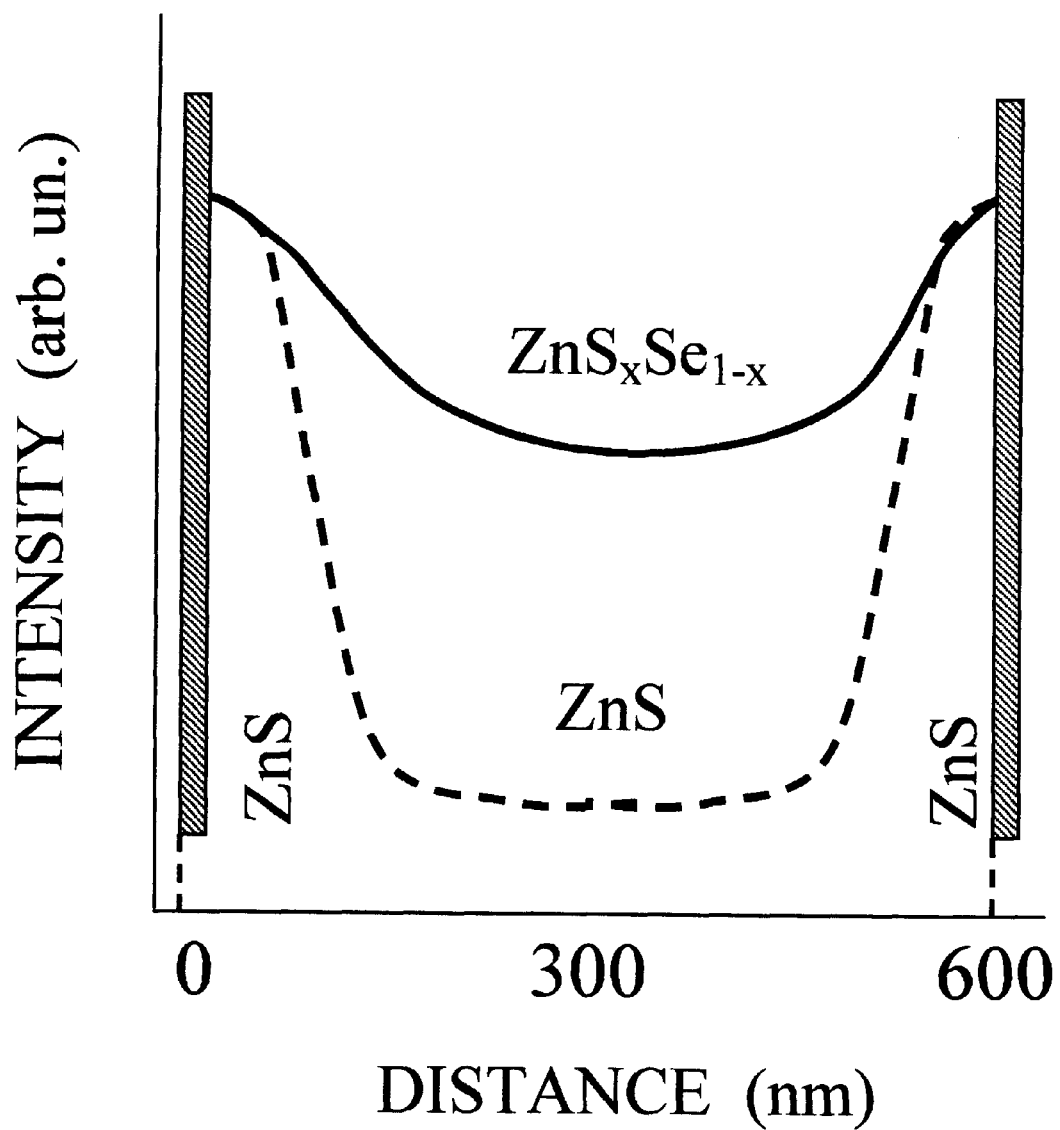
FIG. 3 shows a graph depicting luminance intensities of the conventional and bandgap engineered devices depending on the probe layer position.

Despite of all the listed drawbacks of the $ZnS_xSe_{1-x}$:Mn alloy, a ~2 times brightness increase of the new device compared to a non-bandgap-engineered structure has been achieved. The explanation is evident from FIG. 3, which demonstrates the results of the probe layer analysis, indicating much less significant brightness decrease of the probe layer (a thin Mn-doped layer in otherwise undoped sample) with distance from the momentary cathodic interface of the new device. This in turn suggests higher electron excitation efficiencies; more luminescent centers can be excited by the increased number of electrons at the same amount of the delivered energy. Poor Mn emission in ZnSe, therefore, is compensated with higher excitation efficiency of the kinetic electrons.

Theoretical modeling and preliminary experiments showed the combination of other materials such as CaS, SrS, MgS, BaS, and ZnO along with ZnS may be preferable to maximize the "bandgap" effect. For these materials a steeper variation of the ionization rate with the electric field (and, in turn, with $E_i$) is expected. (See R. Barker, J. Luminescence 23, 101 (1981).) Also, in addition to Mn, experiments to use bandgap engineering for the efficiency increase of alternate dopants, such as Ho, Ce, Pr, etc., were started. The goal of these experiments is to achieve acceptable brightness and efficiency of the device for white and full-color applications.

The present invention provides a novel TFEL device created utilizing the bandgap engineering concept. The suggested active layer bandgap profile allows to significantly increasing the number of electrons hot enough to sustain carrier. multiplication in the bulk of the phosphor layer. Despite of some inherent drawbacks of the $ZnS_xSe_{1-x}$:Mn system, a ~2 times of brightness increase has been achieved in the proposed device.

While only specific combinations of the various features and components of the present invention have been discussed herein, it will be apparent to those of skill in the art that desired subsets of the disclosed features and components and/or alternative combinations of these features and components can be utilized, as desired. All documents and publications referenced herein are hereby incorporated by reference.

What is claimed is:

1. An alternating current thin-film electroluminescent display having:

two stacked dielectrics, a semiconductor active layer therebetween, and metallic cladding electrodes at each side thereof;

wherein the semiconductor layer is developed by automated thermal co-evaporation so as to provide a monotonic decrease of the band gap thereof from the respective interfaces with said stacked dielectrics to the middle of said semiconductor active layer so that the dopant concentration thereof is maintained at about 0.7%.

2. The improved alternating current thin-film electroluminescent display according to claim 1, wherein said two stacked dielectrics comprise SiON as a barrier and either $Y_2O_3$ or $Al_2O_3$ based insulator as an injector;

wherein said metallic cladding electrodes comprise opaque Al and transparent indium tin oxide, respectively; and wherein said semiconductor active layer comprises a $ZnS_xSe_{1-x}$ alloy doped with Mn.

* * * * *